April 29, 1969     R. B. GUNTHER     3,441,115
VALVE HANDLE WITH TORQUE LIMIT ADJUSTMENT MEANS
Filed Nov. 20, 1967
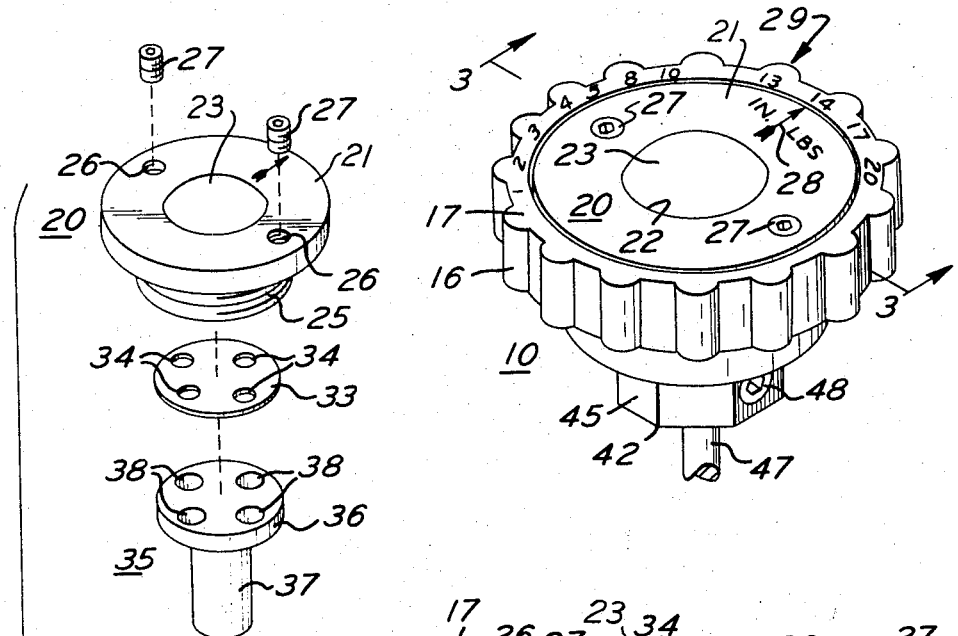
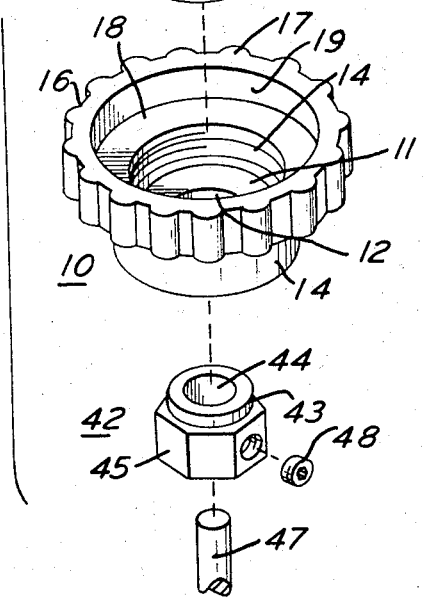
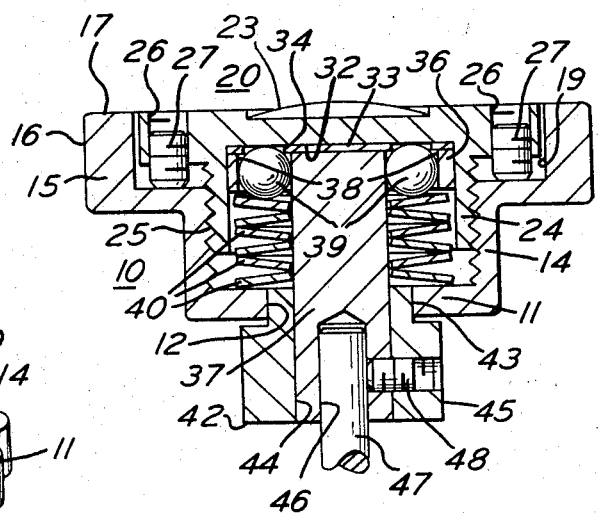
INVENTOR
RUSH B. GUNTHER
BY
ATTORNEY

3,441,115
VALVE HANDLE WITH TORQUE LIMIT ADJUSTMENT MEANS

Rush B. Gunther, Willow Grove, Pa., assignor, by mesne assignments, to The Duriron Company, Inc., Dayton, Ohio, a corporation of New York
Filed Nov. 20, 1967, Ser. No. 684,150
Int. Cl. F16d 23/00, 7/02, 43/20
U.S. Cl. 192—56                                    9 Claims

ABSTRACT OF THE DISCLOSURE

A valve operating handle particularly for valves for high pressure fluid which has a controlled torque to prevent damage to the valve seat upon tightening of the valve, the mechanism shown being easy to make, easy to use and easy to adjust from the top, a manual override also being available.

BACKGROUND OF THE INVENTION

Field of the invention

This invention relates to valve operating handles and more particularly to such handles which limit the torque applied on the valve stem.

DESCRIPTION OF THE PRIOR ART

It has heretofore been proposed in hand tools to provide torque limiting devices. The structures proposed for this purpose are not suited for valve operation, or for incorporation in valve operating handles.

It has also heretofore been proposed in Baker et al., No. 2,881,602 to incorporate releasable driving members in a valve handle but this could not be adjusted in place. Removal of the handle for adjustment is required each time an adjustment is desired. The specific construction also by reason of the coil springs placed serious limitations on the torque which could be transmitted.

SUMMARY OF THE INVENTION

It is the principal object of the present invention to provide a valve operating handle which is simple in construction, is made of relatively few parts which are of adequate strength, which is easy to make, and which can be readily operated.

It is a further object of the present invention to provide a valve operating handle of the character aforesaid which can be readily adjusted from an accessible location, and specifically from the top.

It is a further object of the present invention to provide a valve operating handle of the character aforesaid which can be manually overridden if desired.

Other objects and advantageous features of the invention will be apparent from the description and claims.

BRIEF DESCRIPTION OF THE DRAWING

The nature and characteristic features of the invention will be more readily understood from the following description taken in connection wiht the accompanying drawings forming part thereof, in which:

FIGURE 1 is a view in perspective of a valve operating handle in accordance with the invention;

FIG. 2 is an exploded perspective view of the valve operating handle of FIG. 1; and FIG. 3 is a vertical sectional view taken approximately on the line 3—3 of FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF THE PREFERRED EMBODIMENT

Referring now to the drawings, a valve handle housing 10 is provided which has a lower inturned flange portion 11 with a central opening 12 and a central internally threaded cylindrical portion 14. The housing 10 above the central portion 14 has an outwardly disposed rim 15.

The rim 15 has an outer edge margin 16 which is preferably coarsely serrated to facilitate gripping for manual turning and with an upper face 17, an internal transverse shoulder 18 and an internal cylindrical face 19.

An adjustment cap 20 is provided having an outer face 21 with a central recess 22 for the reception of a bezel 23 for identification purposes.

The cap 20 has a downwardly extending hollow cylindrical portion 24, the outer face 25 of which is threaded for engagement with the threaded portion 14.

A plurality of threaded openings 26 are provided for the reception of set screws 27, which engage the shoulder 18 for clamping as hereinafter pointed out.

The cap face 21 may have thereon an indicating pointer 28 movable with respect to indicia 29 on the upper face 17 to indicate the particular setting.

The interior of the adjustment cap 20 has an end face 32 against which a detent plate 33 is held in fixed engagement either by tightness of fit, or by the use of a suitable interposed adhesive, or in any other desired manner. The detent plate 33 has a plurality of spaced detent openings 34.

A ball retainer 35 is provided having a circular plate portion 36 and a shank 37. The plate portion 36 has a plurality of ball receiving openings 38 for the reception of balls 39.

The balls 39 are urged into the openings 34 by a plurality of spring washers 40, preferably of the Belleville type. The washers 40 are in surrounding relation to the shank 37.

A hub 42 is provided having a reduced upper end portion 43 extending through the opening 12 and into engagement with the lower end of the stack of spring washers 40.

The hub 42 has a central opening 44 complemental to and into which the shank 37 extends and has an outer face 45 of polygonal shape, and preferably hexagonal, for application of a wrench (not shown) for manual override.

The shank 37 has a central opening 46 for the reception of a valve stem 47 of the valve to be operated and a set screw 48 in the hub 42 and extending through the shank 37 engages the valve stem 47 in gripping and holding relation.

The mode of operation will now be pointed out.

When it is desired to turn the valve stem 47 toward the valve seat to close the valve the serrated outer edge margin 16 is grasped by the operator with the fingers and the housing 10 rotated until the desired resistance is encountered. Further turning of the housing 10 does not cause rotation of the valve stem 47 but merely causes the balls 39 to move downwardly from their engagement in the detent openings 34 and slide around the lower face of the detent plate 33, moving into and out of successive openings 34 until the manual turning of the housing 10 is discontinued by the operator.

If it is desired to change the force effective on the valve stem 47, the set screws 27 which are readily accessible at the outer face of the adjustment cap 20 are loosened with a suitable wrench.

The cap 20 is then turned with respect to the housing 10 to tighten or loosen the spring washers 40 in accordance with whether a greater or lesser maximum available force is desired at the valve stem 47. The set screws 27 can then be tightened.

It will be noted that the outer face 45 of the hub 42 may have a wrench applied thereto if it is desired to override the force limiting effect of the resilient holding action of the balls 39.

A wrench inserted in the set screw 48 may also be used to override the resilient holding action of the balls 39.

It will thus be seen that effective provisions have been made for accomplishing the objects of the invention.

I claim:

1. A valve operating handle comprising:
   a housing having a rim for manual engagement,
   an adjustment cap in adjustable threaded engagement in said housing and having an interior detent portion,
   a ball retainer member having a plate portion interposed between said housing and said detent portion,
   a plurality of balls carried by said ball retainer member and engaging said detent member,
   resilient members in said housing interposed between said housing and said plate portion and resiliently urging said balls into engagement with said detent member, and
   a valve stem rigidly coupled to said ball retainer member.

2. A valve operating handle as defined in claim 1 in which:
   said ball retainer member has a shank portion and said resilient members are in surrounding relation to said shank portion.

3. A valve operating handle as defined in claim 1 in which:
   said housing has an outer end face, and
   said adjustment cap has an outer face movable with respect to said face.

4. A valve operating handle as defined in claim 3 in which:
   locking members are provided accessible at the outer face of said adjustment cap for locking said cap and said housing in adjusted position.

5. A valve operating handle as defined in claim 1 in which:
   said ball retainer member has an override portion connected thereto.

6. A valve operating handle as defined in claim 1 in which:
   said resilient members urge said balls in a direction parallel to the longitudinal axis of the valve stem.

7. A valve operating handle as defined in claim 6 in which:
   said resilient members are spring washers.

8. A valve operating handle as defined in claim 1 in which:
   said detent portion is a plate with spaced openings therein.

9. A valve operating handle as defined in claim 1 in which:
   said housing has a cylindrical portion axially spaced from said rim with a threaded interior for engagement by a threaded portion of said adjustment cap,
   said housing has axially of said central portion an inwardly extending flange, and
   said ball retainer member has a hub thereon with an external face for engagement for overriding the resilient releasing action of said balls.

References Cited

UNITED STATES PATENTS

| | | | |
|---|---|---|---|
| 2,288,955 | 7/1942 | Richardson et al. | 64—29 |
| 2,733,622 | 2/1956 | Evans | 192—56 XR |
| 2,797,564 | 7/1957 | Bonneau et al. | 81—52.4 XR |
| 2,881,602 | 4/1959 | Baker et al. | 251—81 XR |
| 2,983,121 | 5/1961 | Naas | 64—29 |

CARLTON R. CROYLE, *Primary Examiner.*

ALLAN D. HERRMANN, *Assistant Examiner.*

U.S. Cl. X.R.

251—81; 64—29